July 6, 1926.
G. W. OTIS
1,591,231
COMBINED MAILING COVER AND FORM
Filed June 27, 1923      3 Sheets-Sheet 1
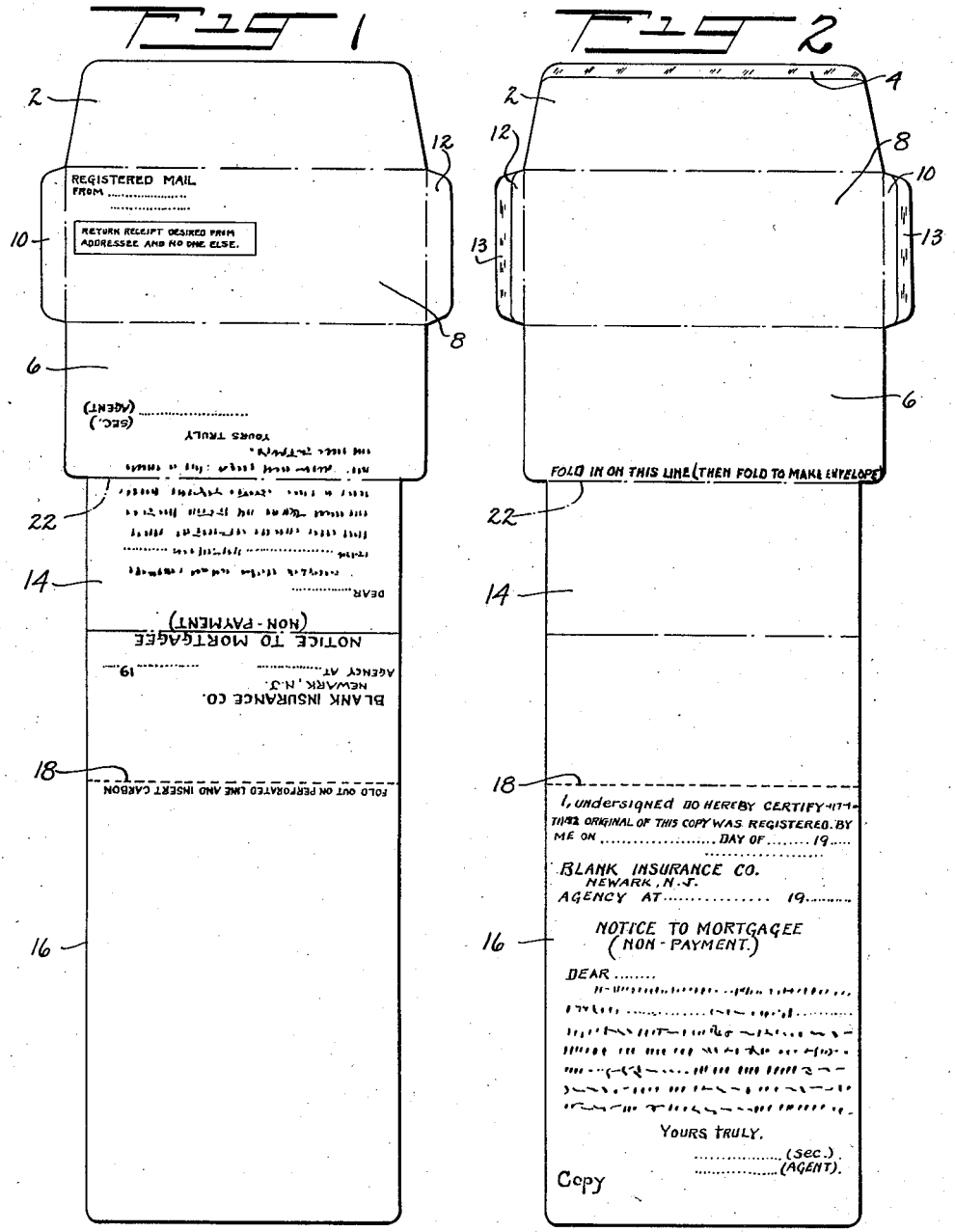
INVENTOR
George W. Otis
BY
Newell and Spencer
ATTORNEYS

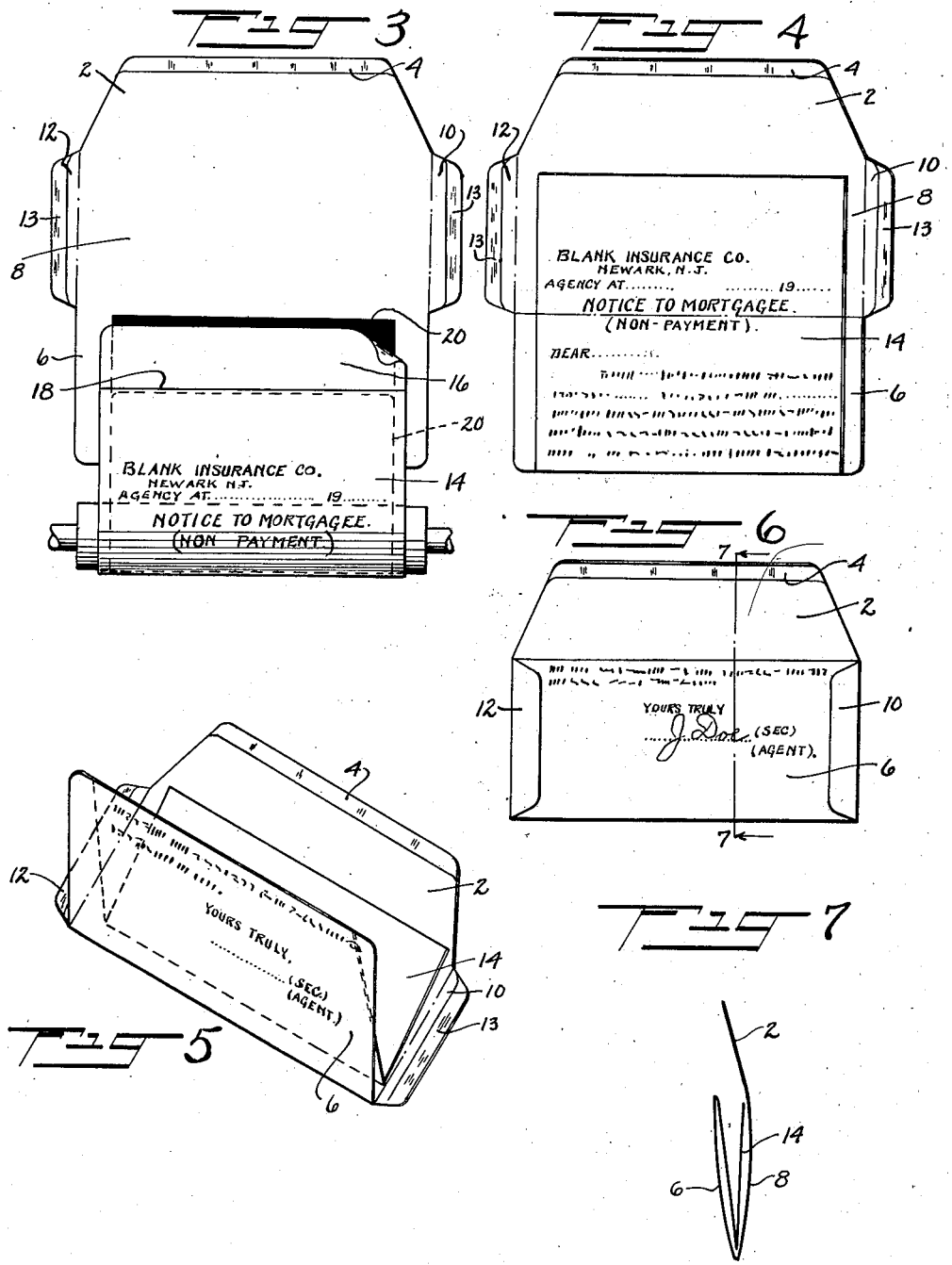

July 6, 1926.  
G. W. OTIS  
1,591,231  
COMBINED MAILING COVER AND FORM  
Filed June 27, 1923  3 Sheets-Sheet 3
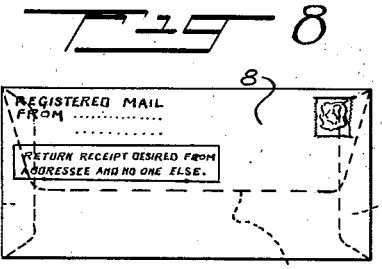
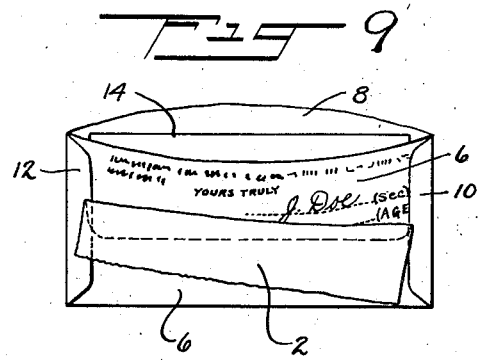
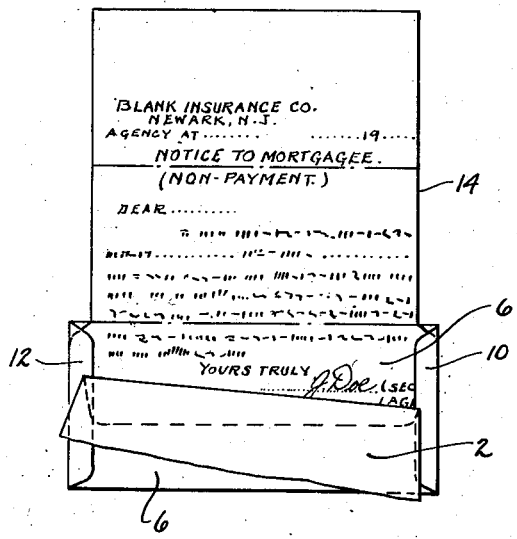
INVENTOR  
George W. Otis  
BY  
Newell and Spence  
ATTORNEYS Patented July 6, 1926.

1,591,231

UNITED STATES PATENT OFFICE.

GEORGE W. OTIS, OF MAPLEWOOD, NEW JERSEY.

COMBINED MAILING COVER AND FORM.

Application filed June 27, 1923. Serial No. 647,966.

This invention relates to a combined mailing cover or envelope and notice or other form, and has for its general object to provide a combined envelope and form which will facilitate proof of service or receipt of notice or other paper when sent by registered mail.

Difficulty has been experienced heretofore by insurance companies and others who are accustomed to use the registered mails to carry notices affecting contractual relations, to prove actual receipt of notice or other paper by the recipient of the registered cover even though the sender produces the return receipt signed by the addressee. One of the most common defenses in cases of this sort is that when the registered cover was opened it was found to be empty and the recipient, therefore, assumed that the sender must have failed to enclose the intended communication.

Attempts to avoid this defense by having the notice form integral with the registered cover have failed heretofore because such constructions have been so arranged that when the cover was opened in the usual manner it likewise appeared to be empty and the recipient could therefore plead justification for assuming it to be empty.

A particular object of the present invention is to provide a combined mailing cover and notice or other form which has its parts so arranged as practically to prevent either such preparation of the notice for transmission as will permit any of the usual defenses heretofore offered, and which, moreover, having thus been properly prepared for transmission and receipted for by the addressee cannot after receipt be so treated as to justify any of the usual defenses heretofore offered.

The invention aims further so to arrange such a fraud-proof combined mailing cover and form as to facilitate the preparation of the form for transmission and the simultaneous preparation of a record for the sender containing, preferably, a duplicate of the form, and, preferably, also a certificate of transmission.

Other objects and important features of the invention will appear from the following description and claims when considered in connection with the accompanying drawings in which—

Fig. 1 is a view of the combined envelope blank and form showing the addressee side of the envelope and the form to be mailed with the envelope to the addressee;

Fig. 2 is a view of the reverse side of the combined blank and form showing the duplicate form to be retained by the sender;

Fig. 3 illustrates the mode of inserting the combined blank and form in the typewriter to fill in the form to be sent and provide a carbon copy thereof upon the duplicate;

Fig. 4 shows the combined blank and form after the carbon duplicate has been detached and the first folding step has been completed in the preparation of the notice for mailing;

Fig. 5 illustrates the second folding step;

Fig. 6 shows the completion of the envelope prior to sealing;

Fig. 7 is a section on the line 7—7 of Fig. 6;

Fig. 8 shows the completed sealed envelope with the enclosed notice viewed from the addressee side;

Fig. 9 illustrates the envelope when slitted for opening in the usual manner, and Fig. 10 shows the notice when withdrawn from the envelope by the recipient.

In the drawings there has been illustrated a combined notice form and mailing cover therefor intended for use in notifying mortgagees named in insurance policies that notice of cancellation of the policy in which the mortgagee is interested has been mailed to the mortgagor, but it will be understood that the invention is not restricted to the particular form of notice herein illustrated.

In the illustrated combined mailing cover and notice, the part of the integral sheet which is to form the mailing cover comprises, at one end of the continuous sheet or strip, a part 2, which is to form the sealing flap for the envelope and which is gummed at 4 for the purpose of securing it in envelope sealing position. Between the flap part 2 and the part 6, intended to constitute the back of the mailing cover or envelope, is an intermediate part 8 intended to constitute the front of the envelope, this part being provided with end flaps 10 and 12 adapted to be folded over the back 6 and secured thereto, the flaps 10 and 12 being gummed at 13 for this purpose. These flaps are preferably comparatively narrow to permit a portion of the back of the envelope to be used to carry a part of the notice or other form.

The main part of the form will be printed upon a sheet 14 integral with and extending from the part 6, the sheet 14 being narrower than the part 6, so that it may be readily withdrawn from the mailing cover or envelope when it is opened by the recipient.

In order to provide a record for the sender, there is preferably also provided a further extension 16, continuous with the sheet 14, but arranged to be separated from the sheet 14 before the notice is prepared for mailing, which separation may be readily effected by tearing along the perforated line 18, this line also serving as a line about which the part 16 is adapted to be folded to bring it beneath the part 14 for making a carbon copy of the notice as it is being filled out upon the part 14.

In Fig. 3 of the drawings is shown the manner of filling out the notice upon a typewriter, the part 16 being folded under the part 14 about the perforated line 18, which then constitutes the end of the sheet to be inserted in the typewriter, the carbon sheet 20 being placed between the parts 14 and 16.

It will be noted that this arrangement of the original form and of the copy facilitates the use of a typewriter in filling out the forms in that the narrow end of the combined form and mailing cover may be inserted in the typewriter and then backed out after being filled out, thus avoiding the necessity for running through the machine the unfolded envelope blank which is usually wider than can readily be accommodated on the ordinary typewriter platen. Moreover, this arrangement of the original form permits an essential part of the notice, namely, the signature of the one signing the notice and enough of the printed form to connect the signature with the notice, to be printed upon a part of the mailing cover, thus preventing the recipient from removing the notice from the cover without obviously mutilating the cover and then alleging that he has never received the notice or that it was not signed.

The form having been filled out in the manner indicated in Fig. 3 and the carbon copy having been detached by severing along the perforated line 18, the notice, after the signature has been attached, is then ready to be put in condition for mailing. In order to insure that the notice shall be in such position in the mailing cover that no allegation can be made that its presence in the cover was not noted when the cover was opened, arrangement has been made for folding the notice or form as an incident of the formation of the mailing cover. This is insured by a single line of instructions which appears at the boundary line between the upper edge of the back of the envelope and the beginning of the insert sheet. As shown in Fig. 2, the instructions for putting the notice in condition for mailing consists simply of the following: "Fold in on this line, then fold to make envelope."

In Fig. 4 is shown the first step when following the instructions, the notice form being folded in on the line 22 of Fig. 2, after which the one preparing the notice for mailing has simply to concern himself with the formation of the mailing cover. As shown in Figs. 5, 6 and 7, this will bring the notice form in such position that its free edge will be up and covered only by the upper edge of the envelope when sealed. When, therefore, the envelope is opened in the usual manner, as shown in Fig. 9, this free edge will be at once exposed and there will be no possible excuse for an assertion by the recipient that he saw no enclosure in the envelope.

Moreover, it will be noted that the sealing flap 2 is of such length and is so gummed at 14 that it is attached to the back 6 of the envelope at a point below that part of the form which appears upon the back so that when the envelope is slitted open as shown in Figs. 9 and 10, this flap will be unattached except at the point where gummed and will at once expose that part of the notice which is printed upon the back 6. The recipient is thus in two ways apprised of the fact that the envelope contains a communication, and when he takes hold of the exposed upper edge of the folded-in notice form and withdraws it, he has the whole notice at once before him, as shown in Fig. 10.

It will further be noted that the gumming of the end flaps 10 and 12 extends to the folding line of these flaps at each end of the gumming, so that when the envelope is slit there is no opening at the ends in which a knife or other envelope opening instrument can readily be inserted, thus practically forcing the recipient to open the envelope in the intended manner by slitting along the upper edge, which is readily permitted by the gumming of the flap 2 only at its edge.

From the foregoing it will be seen that not only is the improved combined mailing cover and form so arranged as substantially to refute fraudulent claims as to receipt of the notice on the part of the recipient, but it is also so arranged that it is practically impossible for the clerk in preparing it for sending, and in making the copy, etc., to use it in any other than the intended way.

What I claim as new is:

1. A combined envelope and notice blank and form comprising an envelope blank having a part to constitute the front of the envelope, a part to constitute the back of the envelope and gummed end flaps arranged to fold over the ends of the latter part and a gummed sealing flap and having integral therewith and extending from the otherwise free edge of the latter part a sheet arranged to be folded into the envelope and having thereon a notice form, the form being printed upon that face of the sheet which is continuous with the back face of the envelope and having a significant part thereof in that part of said back face which is covered by the flap when the envelope is sealed.

2. A combined envelope and notice blank and form comprising an envelope blank having a part to constitute the front of the envelope, a part to constitute the back of the envelope and gummed end flaps arranged to fold over the ends of the latter part shaped to leave space for a portion of the form upon the back of the envelope and having a sealing flap gummed to attach it to said back at a point considerably below the upper edge thereof, said envelope blank having integral therewith and extending from the otherwise free edge of the latter part, a sheet arranged to be folded into the envelope and having thereon a notice form, the form being printed upon that face of the sheet which is continuous with the back face of the envelope and having a significant part thereof upon that part of said back face which is covered by the ungummed part of the envelope flap when the envelope is sealed.

3. A combined envelope and notice form, comprising a continuous sheet having at one end a gummed flap to constitute the envelope flap, and having between said gummed flap and a part adapted to constitute the back of the envelope another part adapted to constitute the front of the envelope, said last mentioned part being provided with flaps extending from the two edges of the sheet, and an insert part narrower than the envelope and extending from the otherwise free edge of the envelope back and having the form printed upon that face thereof which is continuous with the back face of the completed envelope, said form extending into and ending in that part of said back face which is covered by the flap when the envelope is sealed.

4. A combined envelope and notice form comprising a continuous sheet having at one end a gummed flap to constitute the envelope flap and having between said gummed flap and a part adapted to constitute the back of the envelope another part adapted to constitute the front of the envelope, said last mentioned part being provided with flaps extending from the two edges of the sheet, and an insert part narrower than the envelope and extending from the otherwise free edge of the envelope back, said insert part having continuous and integral therewith, but adapted to be detached therefrom, a part adapted to receive a carbon copy of the essential parts of the notice, the form being printed upon that face of the insert which is continuous with the back face of the envelope and beginning at a point on said insert remote from said envelope and ending upon that part of said back face which is covered by the flap when the envelope is sealed, and the form for the carbon being printed upon the opposite face of said extension, whereby, when said extension is folded under the insert part, the folded form may be inserted in the typewriter narrow end foremost.

5. A combined envelope and notice blank and form comprising an envelope blank having gummed end flaps and a gummed sealing flap and having integral therewith and extending from the otherwise free edge of the envelope back a sheet having thereon, upon that face which is continuous with the back face, a notice form, said sheet having upon an extension thereof beyond said form, but upon the opposite face, a duplicate of the notice form, the first mentioned form ending in that part of said back face which is covered by the flap when the envelope is sealed and the duplicate form extending in the opposite direction from said envelope back whereby said last mentioned form may be folded under the first to form a carbon copy of the filled-in form.

6. A combined envelope and notice blank and form comprising an envelope blank having gummed end flaps and a gummed sealing flap and having integral therewith and extending from the otherwise free edge of the envelope back a sheet having thereon a notice form, the form being printed upon that face of the sheet which is continuous with the back face of the envelope and ending in that part of said back face which is covered by the flap when the envelope is sealed, said sheet being of a length greater than the depth of the envelope and said blank and form having printed thereon directions to fold said sheet upon the envelope blank about the line of junction between the two before folding the envelope blank into its envelope forming condition.

7. A combined envelope and notice blank and form comprising an envelope blank having gummed end flaps and a gummed sealing flap and having integral therewith and extending from the otherwise free edge of the envelope back a sheet having thereon, upon that face which is continuous with the back face, a notice form, said sheet having upon an extension thereof beyond said form, but upon the opposite face, a duplicate of the notice form, the first mentioned form ending in that part of said back face which is covered by the flap when the envelope is sealed and the duplicate form extending in the opposite direction from said envelope back whereby said last mentioned form may be folded under the first to form a carbon copy of the filled-in form, said duplicate form comprising also a certificate to be filled in by the one mailing and registering the original.

8. A combined envelope and notice blank and form comprising an envelope blank having a part to constitute the front of the envelope, a part to constitute the back of the envelope and gummed end flaps and a gummed sealing flap and having integral therewith and extending from the otherwise free edge of the latter part a sheet arranged to be folded into the envelope and having thereon a notice form, the form being printed upon that face of the sheet which is continuous with the back face of the envelope and having a significant part thereof in that part of said back face which is covered by the flap when the envelope is sealed, the end flaps being each gummed throughout their entire margins to the line of folding of each whereby when the envelope is sealed there is no opening adjacent the end flaps.

Signed at New York, N. Y., this 23 day of June, 1923.

GEORGE W. OTIS.